(12) United States Patent
Wolf et al.

(10) Patent No.: US 8,347,789 B2
(45) Date of Patent: Jan. 8, 2013

(54) TRANSPORT SYSTEM

(75) Inventors: Konstantin Wolf, Ubstadt-Weiher (DE);
Josef Schmidt, Graben-Neudorf (DE);
Günter Becker, Östringen (DE);
Leobald Podbielski, Karlsruhe (DE)

(73) Assignee: Sew-Eurodrive GmbH & Co. KG,
Bruchsal (DE)

( * ) Notice: Subject to any disclaimer, the term of this patent is extended or adjusted under 35 U.S.C. 154(b) by 794 days.

(21) Appl. No.: 12/223,631

(22) PCT Filed: Jan. 13, 2007

(86) PCT No.: PCT/EP2007/000276
§ 371 (c)(1),
(2), (4) Date: Aug. 4, 2008

(87) PCT Pub. No.: WO2007/090500
PCT Pub. Date: Aug. 16, 2007

(65) Prior Publication Data
US 2009/0013899 A1    Jan. 15, 2009

(30) Foreign Application Priority Data

Feb. 3, 2006 (DE) .......... 10 2006 005 487
Oct. 20, 2006 (DE) .......... 10 2006 049 588

(51) Int. Cl.
*B60L 9/00* (2006.01)
(52) U.S. Cl. ............ 104/290; 191/10; 246/8; 246/194
(58) Field of Classification Search ............ 104/124, 104/126, 244, 245, 287, 288, 290, 292, 297; 191/10; 246/8, 194; 310/12.08, 12.09, 255
See application file for complete search history.

(56) References Cited

U.S. PATENT DOCUMENTS

| | | | | |
|---|---|---|---|---|
| 3,875,868 A | * | 4/1975 | Martin, Jr. ............ | 104/244 |
| 4,375,193 A | * | 3/1983 | Sullivan .............. | 104/118 |
| 5,263,419 A | * | 11/1993 | Moroto et al. ......... | 104/290 |
| 5,467,718 A | * | 11/1995 | Shibata et al. ........ | 104/284 |
| 5,855,261 A | | 1/1999 | Odachi et al. | |
| 5,927,657 A | * | 7/1999 | Takasan et al. ........ | 246/194 |
| 5,941,353 A | * | 8/1999 | Minoshima et al. ..... | 191/10 |
| 6,005,304 A | * | 12/1999 | Seelig ................ | 307/104 |
| 6,089,362 A | * | 7/2000 | Takasan et al. ........ | 191/10 |
| 6,089,512 A | * | 7/2000 | Ansorge et al. ........ | 246/194 |
| 6,397,990 B1 | * | 6/2002 | Brien et al. .......... | 191/10 |
| 6,462,432 B1 | | 10/2002 | Seelig et al. | |

(Continued)

FOREIGN PATENT DOCUMENTS

CA          2 403 762         9/2002

(Continued)

OTHER PUBLICATIONS

International Search Report, PCT/EP2007/000276, dated Oct. 19, 2007.

(Continued)

*Primary Examiner* — S. Joseph Morano
*Assistant Examiner* — Zachary Kuhfuss
(74) *Attorney, Agent, or Firm* — Kenyon & Kenyon LLP

(57) ABSTRACT

A transport system, including a rail system and carriages movably disposed thereon, the rails being encompassed by a primary conductor system to which at least one secondary coil, included by the carriage, is inductively coupled for the contactless transfer of electrical energy and/or information.

25 Claims, 5 Drawing Sheets

U.S. PATENT DOCUMENTS

| | | |
|---|---|---|
| 6,571,716 B2 | 6/2003 | Albrich |
| 6,978,873 B2 * | 12/2005 | Ishioka ............................ 191/10 |
| 7,124,692 B2 * | 10/2006 | Guenther et al. ............. 105/148 |
| 7,204,192 B2 * | 4/2007 | Lamb et al. .................... 104/282 |
| 7,232,020 B2 * | 6/2007 | Futschek .......................... 191/10 |
| 7,511,250 B2 * | 3/2009 | Lindig ........................... 219/647 |
| 2005/0098404 A1 * | 5/2005 | Swoboda et al. ............... 191/10 |
| 2005/0121557 A1 | 6/2005 | Futschek |

FOREIGN PATENT DOCUMENTS

| | | |
|---|---|---|
| DE | 553540 | 6/1932 |
| DE | 662818 | 7/1938 |
| DE | 24 06 080 | 8/1975 |
| DE | 44 46 779 | 6/1996 |
| DE | 195 12 107 | 10/1996 |
| DE | 197 35 624 | 12/1998 |
| DE | 100 14 954 | 10/2001 |
| EP | 0 814 994 | 1/2000 |
| EP | 1 238 880 | 9/2002 |
| JP | 5-207605 | 8/1993 |
| WO | WO 92/17929 | 10/1992 |
| WO | WO 98/57413 | 12/1998 |
| WO | WO 03/026915 | 4/2003 |
| WO | WO 2007/007028 | 1/2007 |

OTHER PUBLICATIONS

Song et al., "Contactless Inductive Power Pickup System for Maglev Applications," Conference Record of the 2002 IEEE Industry Applications Conference, 37th IAS Annual Meeting, Pittsburgh, PA, Oct. 13 to 18, 2002, Conference Record of the IEEE Industry Applications Conference, IAS Annual Meeting, New York, NY, IEEE, US, vol. 1 of 4, Conf. 37, Oct. 13, 2002, pp. 1586 to 1591, XP010610091, ISBN: 0-7803-7420-7.

European Office Action, dated Aug. 19, 2010, issued in corresponding European Patent Application No. 07702748.0.

Translation of International Preliminary Report on Patentability, PCT International Patent Application No. PCT/EP2007/000276, dated Sep. 18. 2008.

* cited by examiner

TRANSPORT SYSTEM

FIELD OF THE INVENTION

The present invention relates to a transport system.

BACKGROUND INFORMATION

German Patent No. 44 46 779 describes a contactless energy-transfer system having a U-shaped pick-up. A system of this kind is described in German Patent No. 197 35 624, as well.

PCT International Published Patent Application No. WO 92/17929 describes a contactless energy-transfer system having an E-shaped pick-up.

Japanese Published Patent Application No. H5-207605 describes a contactless energy-transfer system having a C-shaped pick-up.

German Published Patent Application No. 195 12 107 describes a leaky wave conductor for transmitting information.

SUMMARY

Example embodiments of the present invention provide a transport system which is versatilly usable and easily manufacturable.

According to example embodiments of the present invention, a transport system includes a rail system and carriages movably disposed thereon; provided at the rail system is a primary conductor system to which at least one secondary coil, included by the respective carriage, is inductively coupled for the contactless transfer of electrical energy and/or information. The carriage is able to be powered without wear, and is movable on the rail system.

The carriage may be supplied with energy from the secondary coil is able to be driven by an eddy-current drive at the rail system, the drive in particular including at least one disk which is driven by an electric motor and includes alternately oriented magnetic regions that interact with a region formed on the rail system, the region being formed in particular on the protruding sword or tongue on the rail profile. This provides that the rail system itself is able to be provided as reaction rail for the eddy-current motor. Thus, it only has to be suitably formed, and no further additional parts become necessary. In addition, the heat may be dissipated directly via the rail profile. A high power output of the drive is therefore able to be dimensioned.

Running surfaces for guide rollers of the carriage wheels, particularly running surfaces curved for the purpose of self-centering, may be formed at the rail profile. By mere shaping, the rail profile may assume the additional function of the running surfaces, thus, the centering of the carriage. In addition, in so doing, the curvature is configurable such that self-centering is accomplished. In this context, it may be provided to form two curved running surfaces, e.g., in mirror symmetry to each other, so that the normal forces produced by the respective guide rollers on the running surfaces generate a resulting force which is directed in the gravitational direction. In response to deviations from the stable position, tilting forces result which are directed such that the carriage is tilted into the stable position. The amount of this restoring force increases with the angular deviation from the stable position. For example, the amount is proportional to the angular deviation. Therefore, even small deviations are rapidly damped.

In particular, circularly curved running surfaces are especially easy to produce.

In order to strongly damp large excursions from the stable position, deviations from the circular curvatures are also possible.

A cable-channel holder may be able to be clamped on the rail profile, to which holder a retaining profile for accommodating go conductors and/or return conductors of the primary conductor system is able to be joined, in particular is able to be clipped on, with form locking and/or force locking. The rail profile may also be used for securing the primary conductors, and therefore the relative position between carriage and rail profile may be able to be exactly maintained.

A holding plate for accommodating a coaxial conductor may be able to be joined with force and/or form locking—in particular is able to be clamped—to the rail profile, an antenna being provided in particular on the carriage which is movable along the coaxial conductor upon movement of the carriage. Data may also be exchanged easily and cost-effectively.

Provided at the rail profile may be an accommodation for supply lines, particularly for the supply of adjacent sections of the system. This may provide that further sections are able to be powered. The supply lines for the primary conductors of the next section are thus able to be secured to the rail profile of the first section, and no disadvantageous magnetic fields exist in the first section which interfere with or impair the energy transfer there. For example, the supply lines may be arranged as power supply lines for the supply of feeder devices assigned to the next section. Such a feeder device includes inverters for producing medium-frequency voltages, from which a gyrator is able to be fed that generates currents able to be supplied to the respective primary-conductor system.

According to example embodiments of the present invention, a transport system includes a rail system and carriages movably disposed thereon, the rails being encompassed by a primary conductor system to which at least one secondary coil, included by the carriage, is inductively coupled for the contactless transfer of electrical energy and/or information.

The transport system may also be usable outdoors or in a low-temperature or humid environment, because the rails are part of the primary conductor system and therefore are at least slightly heated by the current. The danger of a moisture deposit or ice formation is thereby reduced. Since the rails are used by the primary conductor system, only a few parts are necessary for the system, and it is inexpensive and uncomplicated to set up.

The wheels are guidable or guided by the rails. Therefore, the rails fulfill a dual function, namely, conducting the primary current and guiding the carriages.

The wheels may be tapered. Thus, self-centering may be able to be provided.

Additional guide rollers may be provided. Thus, a lateral guidance may be provided in simple fashion.

The rails may be implemented as tubes, particularly with which the wheels are in contact. High mechanical and electrical load capacity may be attainable with little mass.

The wheels may be driven by an electric drive, particularly an eddy-current motor, asynchronous motor, synchronous motor and/or reluctance motor or a different electric motor. Conventional types of drives may be used.

The drive may include an integrated gear unit and/or control electronics. Inverter electronics are able to be integrated. The rails may take the form of go conductors of a loop of the primary conductor system, and a return conductor may be provided parallel to the rails. This provides that few parts are necessary.

One or more go conductors and/or return conductors may be at least partially enclosed, especially in the radial direction, by a ferrite core, particularly a U-shaped, C-shaped or E-shaped ferrite core of a secondary coil winding. A good coupling may be achievable, and therefore a good efficiency factor may be provided.

The return conductor may be retained with force locking and/or form-locking in a retaining profile. The retaining profile may be produced as a plastic extruded part, and therefore an additional electrical insulation of the return conductor may be attainable, while at the same time realizing the retaining function.

Provided parallel to the go conductor and return conductor may be a slotted coaxial conductor, thus a leaky-wave conductor, along which an antenna of the carriage is movable for the high-frequency data transmission, particularly upon movement of the carriage. A high data flow may be transmittable reliably and with little interference.

A medium-frequency current, particularly with a frequency between 10 and 100 kHz, may be injected into the primary conductor system. Rapid changes in the power to be transmitted may be provided for, and the skin effect may not be too strong. Thus high currents, particularly more than 10 ampere, are able to be transmitted.

A higher-frequency alternating current, particularly having a minimum frequency of 150 kHz, may be superposed for the data transmission. Thus, transfer of data may be easily realizable.

The transfer of data may be implemented redundantly, in particular on one hand via the inductive coupling of the primary conductor to a secondary winding, and on the other hand, via the coupling of the antenna to the primary conductor. This may provide that reliability during the transfer of data is able to be increased.

Spacers may be disposed along the rails, particularly for fixing the tubes in position relative to each other. The spacers may be able to be produced from plastic, and the rails may be able to be stabilized.

A plate may be provided at the drive for the connection to a load to be transported. A load may be mounted directly on the drive, or an interface for the mounting of various loads is able to be provided with the aid of the plate. In addition, heat from the drive is able to be dissipated via the plate to the surroundings. The reason is that the plate is usable for spreading heat, and greatly relieves the drive from the standpoint of heat engineering.

LIST OF REFERENCE NUMERALS 1 support
2 primary conductor
3 spacer
4 carriage
5 spacer with cable mounting tube
20 wheel
21 plate
22 drive
23 antenna
24 coaxial conductor
25 retaining profile
26 base retaining profile
27 U-shaped pick-up
28 electronic device having power electronics
29 guide rollers
30 electric motor
31 electrical connection terminals
32 disk
33 magnetic layer
33 a magnets having alternating magnetization orientation
34 sword or tongue
35 rail profile
36 accommodation area for power supply cable
37 cover
38 clamping plate
39 mounting support for coaxial conductor
40 guide rollers
41 bars structure or linkage
42 curved running surface
43 running surface
44 cable channel holder
45 receiving area for bar code or reading marks

Example embodiments of the present invention are explained in more detail below with reference to the appended Figures.

Figure 1:
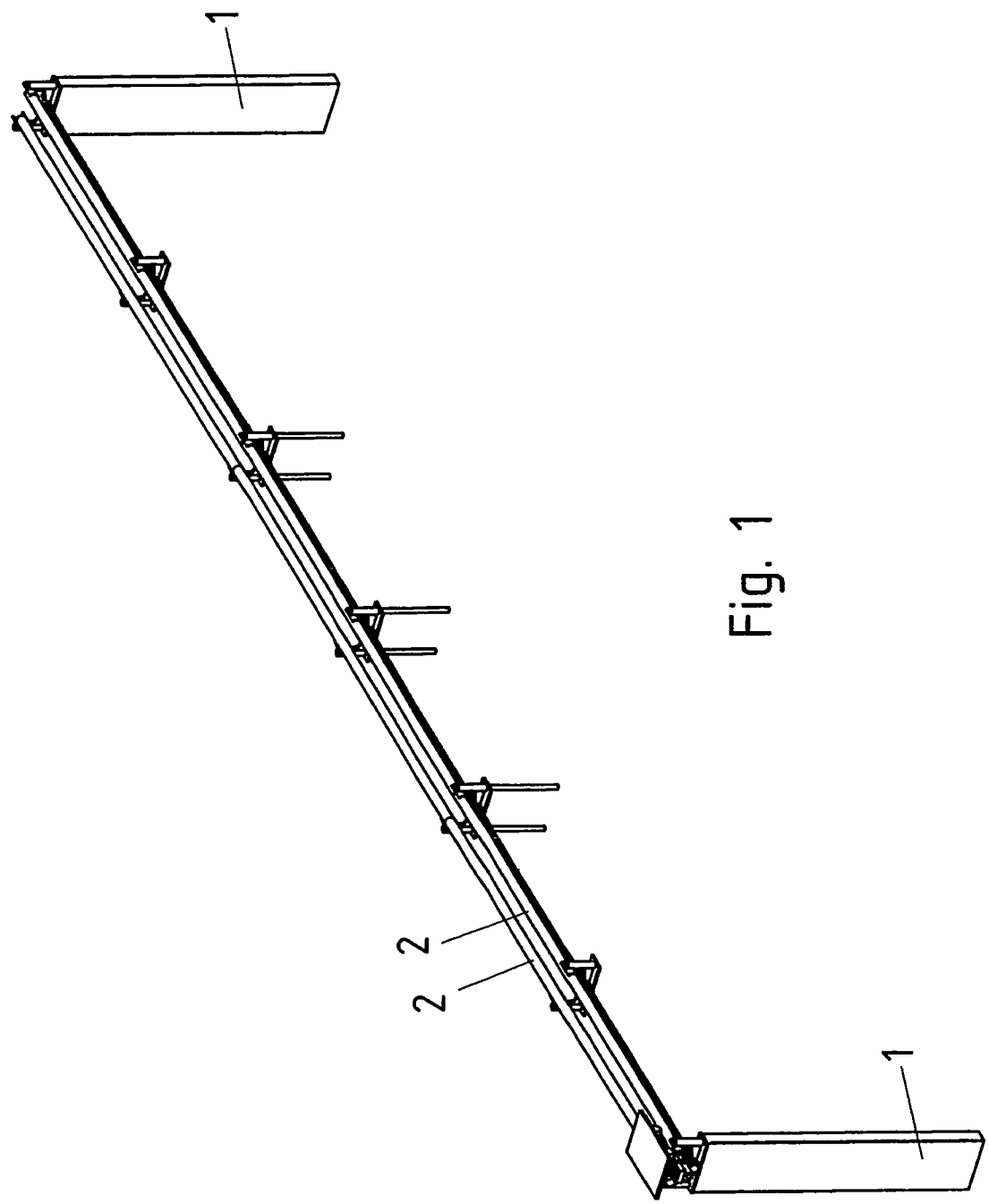
FIG. 1 is an oblique view of a stationary part of a transport system according to an example embodiment of the present invention.
Figure 1A:
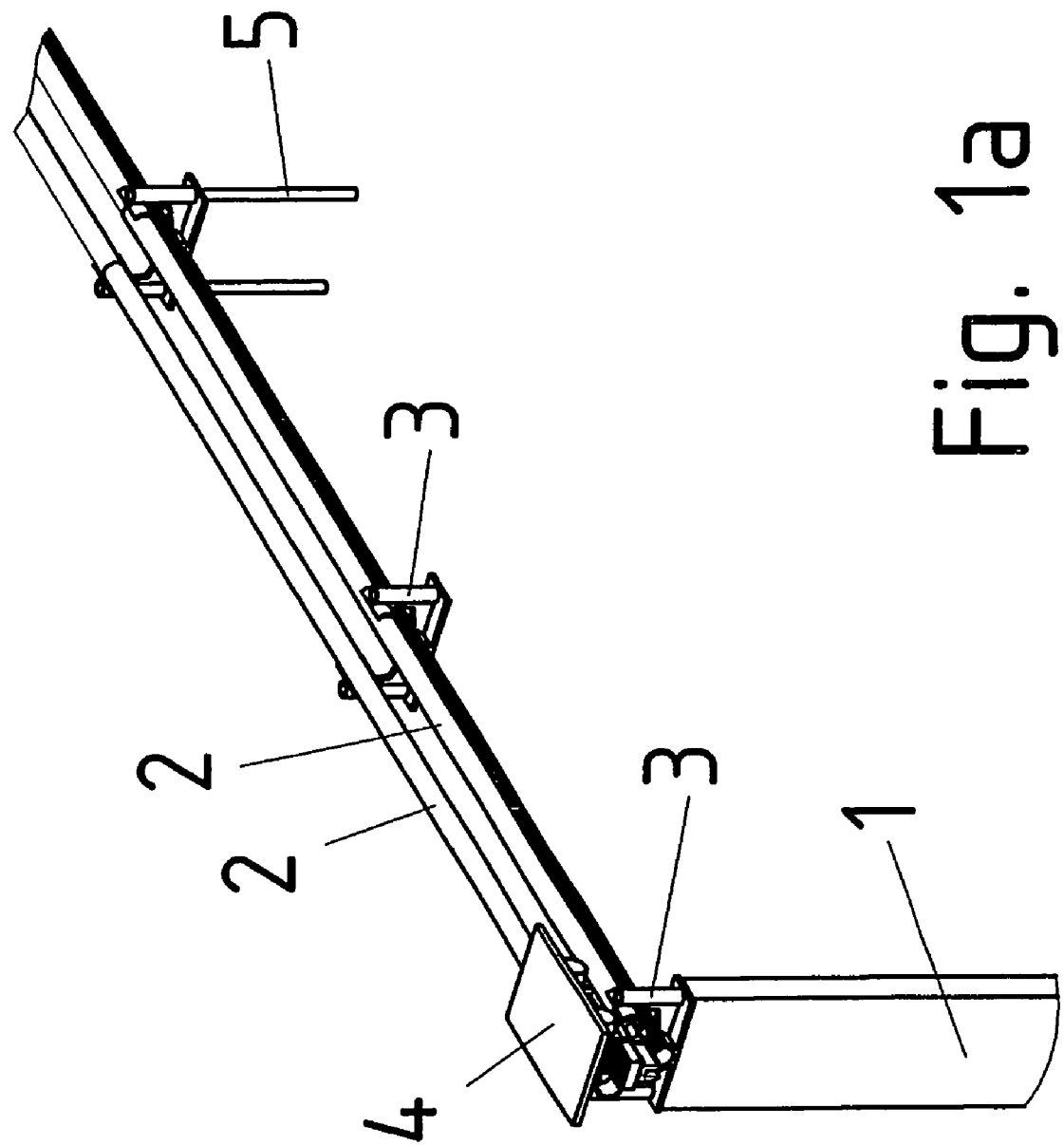
FIG. 1a is an oblique view of a stationary part of a transport system according to an example embodiment of the present invention.

The stationary part of the transport system according to example embodiments of the present invention is shown schematically in an oblique view in FIG. 1.

The line section is supported by supports 1. By way of example, these supports 1 may be produced from concrete and/or steel. The line section includes retaining elements which retain primary conductors. Two go conductors 2 are laid out in elongated fashion, and one return conductor is disposed parallel to them. The return conductor is hidden in FIG. 1 and is inserted in holder or retaining profile 25 in FIG. 2. Therefore, aluminum may be used as material for the two go conductors. The reason is that the resistance is reduced by the selection of two go conductors 2 connected in parallel.

A feeder device feeds medium-frequency alternating current into the primary conductor system, which is in the form of a loop that includes go conductors and return conductors.

The movably disposed loads are implemented as carriages, thus vehicles, and include at least one secondary coil which is inductively coupled to the primary conductor system, and in this manner the carriages are able to be provided with electrical power and information in contactless fashion.

In a further exemplary embodiment, a slotted coaxial conductor 24, which is also denotable as a leaky-wave conductor and is suitably implemented for transferring data, is laid out along the line section, each of the carriages including at least one antenna which is guided along this coaxial conductor. In this manner, a high-frequency data transmission is possible. Thus, the data transmission is even redundantly executable, namely, on one hand, via the coaxial conductor, and on the other hand, via the inductive coupling of the primary conductors and secondary coil.

The medium-frequency alternating current may be injected with a frequency between 10 and 100 kHz into the primary conductor system. The indicated high-frequency is provided at higher frequency for the data transmission.

Go conductors 2 have not only the function of the electro-conduction of the primary electrical current, but also the mechanical rail function for the carriages.

This is because the wheels of the carriages roll on the rails, i.e. the go conductors 2, and are supported there.

Spacers 3 ensure the constant spacing of go conductors 2 relative to each other. They are provided at suitable distances along the line section. At least some of the spacers are joined to supports 1 for bracing the primary conductors. Therefore, the primary conductors are retained via these spacers. Spacers 5 having a cable mounting tube extension are also provided; retaining cables to further stabilize the stationary part of the transport system are able to be provided on the cable mounting tube extension.

Each go conductor 2 may be implemented as a tube. It is therefore possible to produce high mechanical load capacity and a high current density, accompanied by small mass. The reason is that because of the skin effect operative when working with medium-frequency current, the tube transmits a high current.

Nevertheless, a certain heating of the tubes occurs, which, however, is advantageous in the case of outdoor facilities.

The reason is that icing or deposit of moisture is thus prevented. Even if there is only a slight temperature difference with respect to the surroundings, a deposit of moisture is avoided. Thus, the transport system may be used for industrial facilities on one hand, and for other applications outdoors on the other hand.

Figure 2:
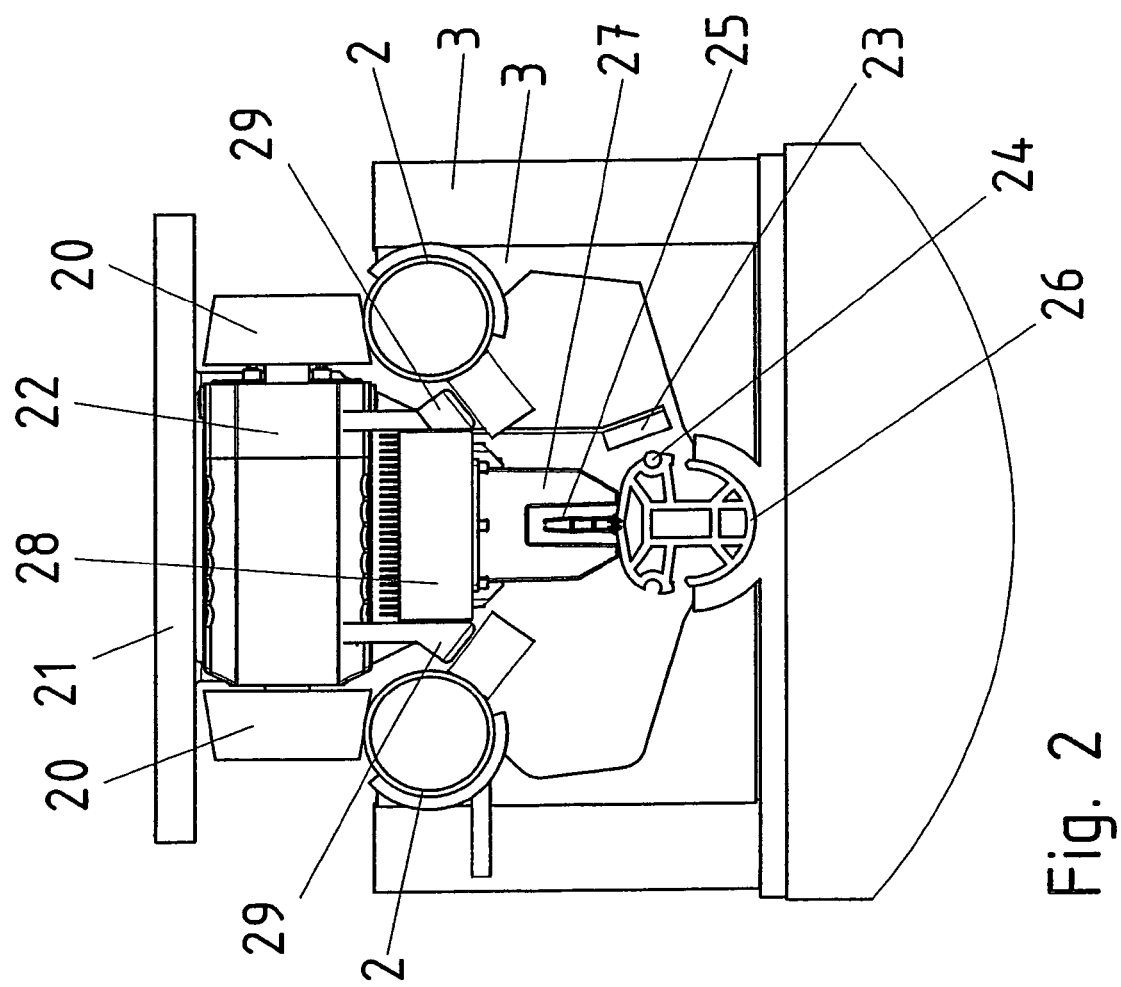
FIG. 2 is an oblique view of a carriage of a transport system according to an example embodiment of the present invention.

The carriage is more clearly discernible in FIG. 2. The wheels are tapered or conical for the self-centering of the carriage between go conductors 2 in the form of tubes. These tubes are joined to the spacers, which are joined to base retaining profile 26 into which, on one hand, a coaxial conductor is insertable, and into which, on the other hand, a retaining profile 25 may be clipped which is suitably implemented for accommodating the return conductor. In particular, this return conductor is able to be clipped in.

Wheels 20 of the carriage are driven by electric drive 22, taking the form of an electric motor. The drive includes suitable power electronics and signal electronics in its housing. Depending on the speed desired, it is also possible to provide for a gear unit integrated in drive 22. A plate 21 may be provided on the housing of the drive.

An electronic device 28 having power electronics may also be provided at the drive, and an antenna 23 is connectable. In this context, the antenna is provided for the transfer of data between the stationary part of the transport system and coaxial conductor 24, coaxial conductor 24 being clippable into base retaining profile 26.

The secondary coil is provided in a U-shaped pick-up 27. In this case, a U-shaped ferrite core is provided which partially surrounds the return conductor, and therefore brings about a good inductive coupling. In U-shaped pick-up 27, a capacitor is also connected in series or in parallel with the secondary coil in such a way that the resonant frequency corresponds substantially to the medium frequency of the current injected into the primary conductor system. Thus, a good efficiency factor is achievable when transferring energy, even across a large air gap.

Also provided at the drive is a mounting support for guide rollers 29 for the lateral guidance. During normal operation, guide rollers 29 should have no contact with the stationary part of the transport system. Only in response to the appearance of deviations is the carriage retained by the guide rollers in the desired orientation.

Figure 3:
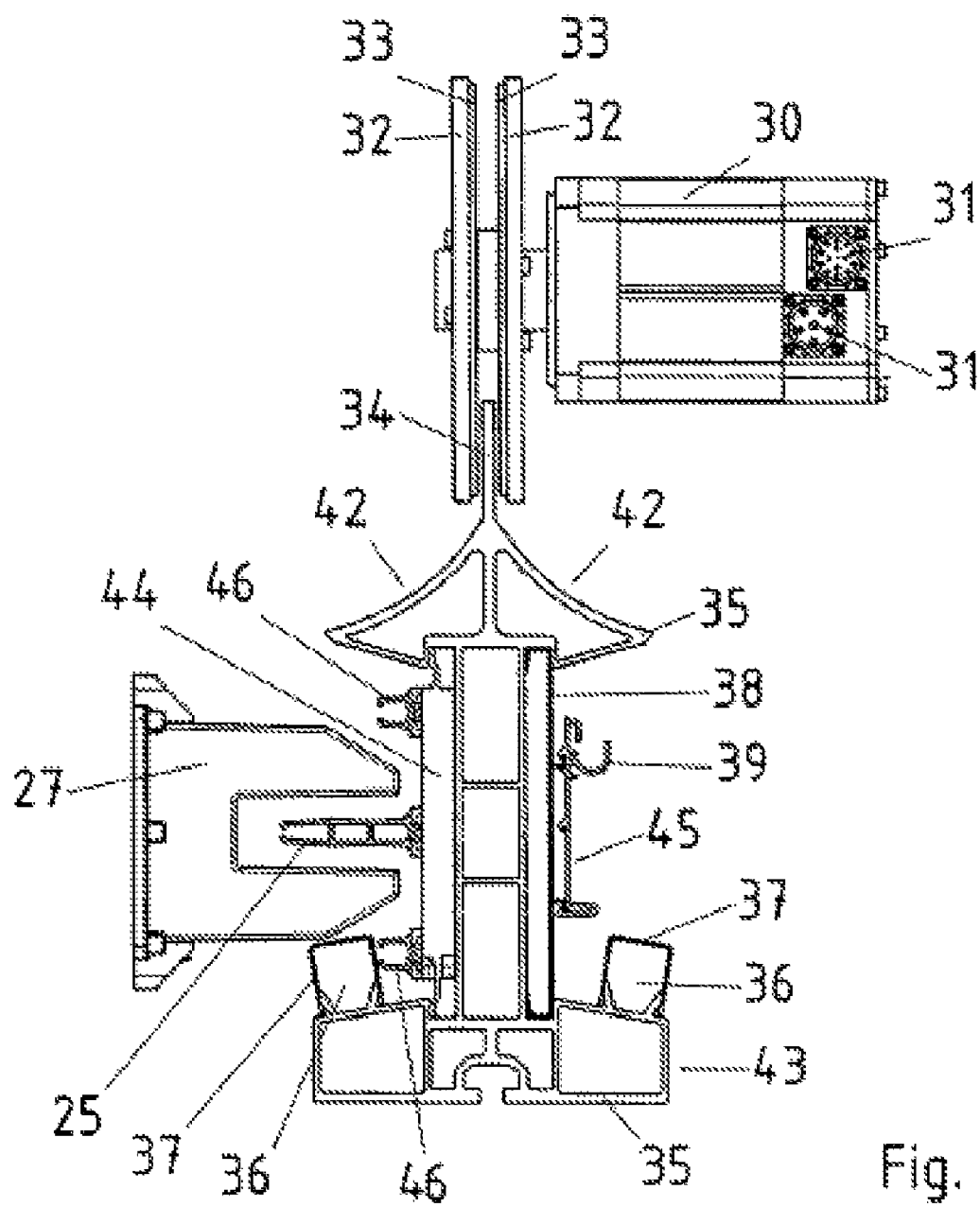
FIG. 3 is an oblique view of a carriage of a transport system according to an example embodiment of the present invention.
Figure 4:
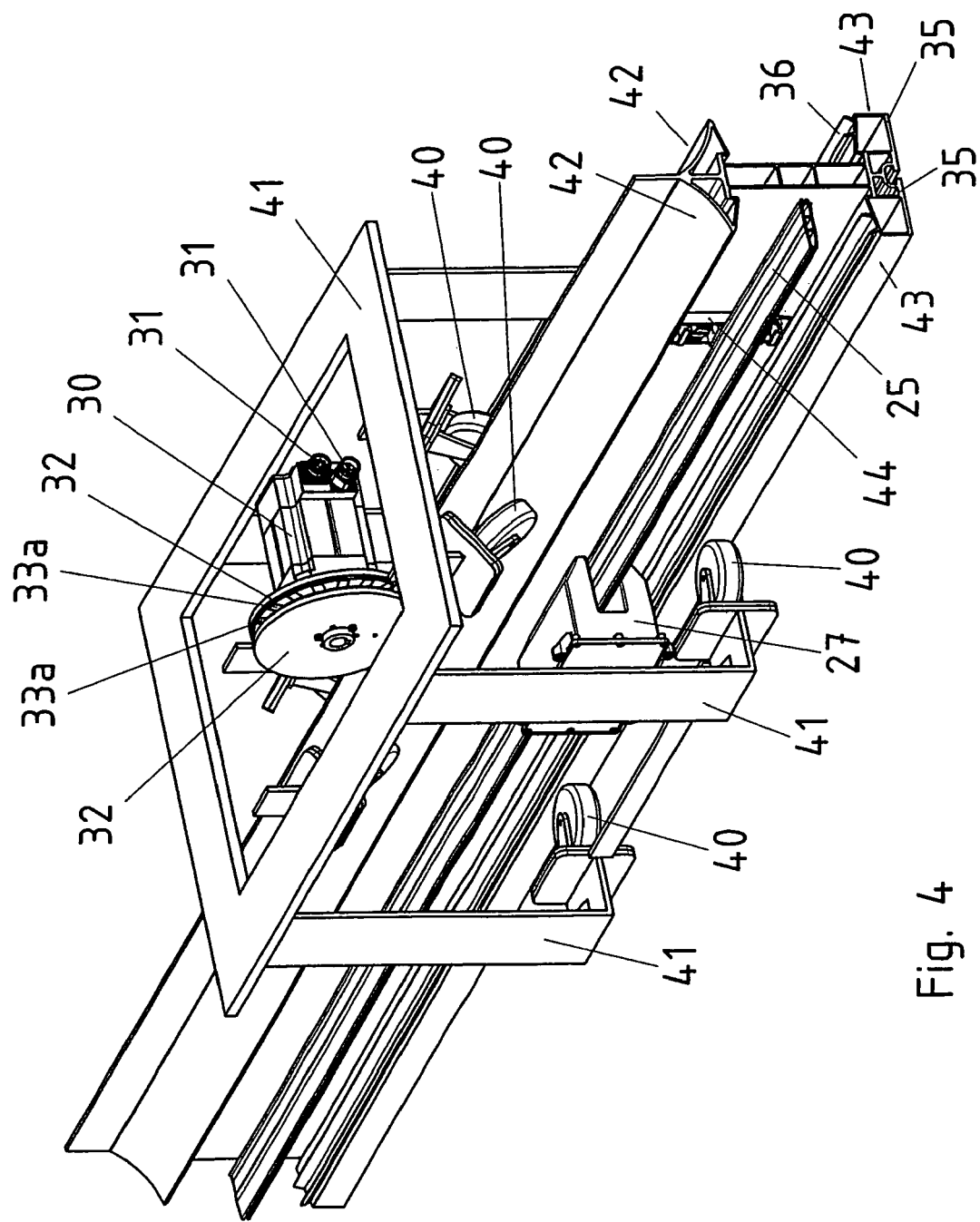
FIG. 4 is an oblique view of a carriage of a transport system according to an example embodiment of the present invention.

FIG. 3 shows the intersection through another exemplary embodiment. FIG. 4 shows a further example, as well. Components and devices are omitted in part.

In FIG. 3, the carriage includes electric motor 30, which in turn has electrical connection terminals 31. The motor drives disks 32, on which is applied a magnetic layer 33 having magnetic regions which follow one another in the circumferential direction and are alternately magnetized in the axial direction. The motor is operated at high speed, preferably more than 3000 revolutions per minute. The higher the speed, the greater the efficiency of the drive. Very good results are obtained at 10,000 revolutions per minute.

The drive operates according to the eddy-current principle and generates its force through the eddy currents in sword 34 of rail profile 35, which interact with the changeable magnetic field produced by the rotational movement of the motor. The feed force acts in the rail direction.

To produce an acceleration in braking, the running direction of the motor must be slowed down or reversed to the greatest extent possible.

The control electronics controlling the motor take the heating of the sword into account by modeling, and control the motor such that the heating is kept below a critical value.

Rail profile 35 also has an accommodation area 36 for power-supply cables which feed the next rail section. The cables are able to be traversed. In the next rail section, the energy which has been passed through may then be made available to the primary conductors there. Areas 36 may be provided with a cover 37. This may also be provided with material screening a magnetic field.

A mounting support 39 for coaxial conductors may be provided on clamping plate 38. The carriage also includes an antenna, which is guided along the coaxial conductor for the exchange of data. Alternatively or additionally, a bar code may also be applied at receiving area 45 on mounting support 39. Instead of bar code, other reading marks may also be applied. For the bar code or the other reading marks, optionally an appropriate scanner may be provided on the carriage, which is suitable for reading the information and therefore makes position sensing feasible. The information is processed by the electronic device of the carriage and is signaled via the means for data transmission, such as coaxial conductors and/or radio waves, to a central control unit.

The carriage is guided by guide rollers 40 which are provided on the bars structure or linkage of the carriage and which are able to roll on running surfaces 42, 43. In this context, running surfaces 43 are used for lateral horizontal stabilization. Curved running surfaces 42 are used for stabilization in the gravitational direction. The curvature of running surfaces 42, together with the guide rollers disposed obliquely with respect to the gravitational direction, results in a self-stabilization, which is particularly important in the area of curves. In straight rail sections, stabilization and reduction of oscillations about the neutral position are ensured.

At rail profile 35, with the aid of a cable channel holder 44 able to be clamped by turning in a corresponding accommodation area, a retaining profile 25 is able to be provided. A plurality of go conductors are in turn able to be clipped with force and form locking on this retaining profile 25. The return conductors are able to be clipped in a different retaining profile 46, which is attachable to cable-channel holder 44.

Due to the oblique view in FIG. 4, individual magnetic regions 33a placed side-by-side in the circumferential direction and having the alternating magnetization orientation in the axial direction of the electric motor are also visible.

The electronic device is not shown in FIGS. 3 and 4. However, it is included by the carriage. Also, the bars structure of the carriage is not shown in FIG. 3. In the carriage according to FIG. 3, motor 30 and U-shaped pick-up 27 are connected via a linkage.

In a further exemplary embodiment, at least one temperature sensor is used, which measures the ambient temperature. In addition, a further temperature sensor may be used, which measures the temperature of the sword. For example, an infrared temperature sensor is usable for this purpose. In this manner, the maximum allowed feed force is attainable. Destruction of the sword is prevented.

What is claimed is:

1. A transport system comprising,
a rail system including a primary conductor system; and
carriages movably disposed on the rail system and including at least one secondary coil inductively coupled to the primary conductor system and arranged for contactless transfer of at least one of (a) electrical energy and (b) information,
wherein a cable-channel holder is clampable on a profile of the rail, a plurality of retaining profiles are attached to the cable-channel holder, the retaining profiles being adapted to accommodate one or more go conductors and one or more return conductors of the primary conductor system, the go conductors and return conductors being at least one of (a) joinable and (b) clippable onto the retaining profiles, using at least one of (a) form locking and (b) force locking,
wherein wheels of the carriages are tapered for self-centering.

2. The transport system according to claim 1, wherein the carriage supplied with energy from the secondary coil is drivable by an eddy-current drive at the rail system, the drive including at least one disk driven by an electric motor and includes alternately oriented magnetic regions that interact with a region formed on the rail system, the region formed on a protruding tongue on the profile of the rail.

3. The transport system according to claim 1, wherein the profile of the rail includes running surfaces for guide rollers of the wheels of the carriage.

4. The transport system according to claim 1, wherein the rail profile includes an accommodation for supply lines for supply of adjacent sections of the system.

5. The transport system according to claim 1, wherein the retaining profile is a plastic extruded part.

6. The transport system according to claim 1, wherein the at least one return conductor is clipped into the retaining profile.

7. The transport system according to claim 1, wherein the plurality of retaining profiles are attached to the cable-channel holder using at least one of (a) form locking and (b) force locking.

8. The transport system according to claim 1, wherein the plurality of retaining profiles are clipped to the cable-channel holder using at least one of (a) form locking and (b) force locking.

9. The transport system according to claim 1, wherein the wheels of the carriages are drivable by at least one of (a) an electric drive, (b) an eddy-current motor, (c) an asynchronous motor, (d) a synchronous motor, (e) a reluctance motor, and (f) an electric motor.

10. A transport system comprising,
a rail system including a primary conductor system; and
carriages movably disposed on the rail system and including at least one secondary coil inductively coupled to the primary conductor system and arranged for contactless transfer of at least one of (a) electrical energy and (b) information,
wherein a cable-channel holder is clampable on a profile of the rail, a plurality of retaining profiles are attached to the cable-channel holder, the retaining profiles being adapted to accommodate one or more go conductors and one or more return conductors of the primary conductor system, the go conductors and return conductors being at least one of (a) joinable and (b) clippable onto the retaining profiles, using at least one of (a) form locking and (b) force locking,
wherein the profile of the rail includes running surfaces for guide rollers of the wheels of the carriage,
wherein the running surfaces are curved for self-centering.

11. A transport system comprising,
a rail system including a primary conductor system; and
carriages movably disposed on the rail system and including at least one secondary coil inductively coupled to the primary conductor system and arranged for contactless transfer of at least one of (a) electrical energy and (b) information,
wherein a cable-channel holder is clampable on a profile of the rail, a plurality of retaining profiles are attached to the cable-channel holder, the retaining profiles being adapted to accommodate one or more go conductors and one or more return conductors of the primary conductor system, the go conductors and return conductors being at least one of (a) joinable and (b) clippable onto the retaining profiles, using at least one of (a) form locking and (b) force locking,
wherein a holding plate adapted to accommodate a coaxial conductor is at least one of (a) joinable and (b) clampable with at least one of (a) force locking and (b) form locking to the rail profile, an antenna being provided on the carriage which is movable along the coaxial conductor upon movement of the carriage.

12. A transport system comprising,
a rail system, rails of the rail system including a primary conductor system; and
carriages movably disposed on the rail system and including at least one secondary coil;
wherein the secondary coil is inductively coupled to the primary conductor system for contactless transfer of at least one of (a) electrical energy and (b) information,
wherein a cable-channel holder is clampable on a profile of the rail, a plurality of retaining profiles are attached to the cable-channel holder, the retaining profiles being adapted to accommodate one or more go conductors and one or more return conductors of the primary conductor system, the go conductors and return conductors being at least one of (a) joinable and (b) clippable onto the retaining profiles, using at least one of (a) form locking and (b) force locking,
wherein wheels of the carriages are tapered for self-centering.

13. The transport system according to claim 12, further comprising guide rollers.

14. The transport system according to claim 12, wherein wheels of the carriages are drivable by at least one of (a) an electric drive, (b) an eddy-current motor, (c) an asynchronous motor, (d) a synchronous motor, (e) a reluctance motor, and (f) electric motor.

15. The transport system according to claim 14, wherein the drive includes at least one of (a) an integrated gear unit, (b) control electronics, and (c) inverter electronics.

16. The transport system according to claim 14, further comprising a plate provided at the drive for connection to a load to be transported.

17. The transport system according to claim 12, wherein the rails are arranged as the go conductors of a loop of the primary conductor system, and the at least one return conductor is provided parallel to the rails.

18. The transport system according to claim 12, wherein at least one of (a) at least one go conductor and (b) at least one return conductor is at least partially enclosed in a radial direction by at least one of a (a) ferrite core, (b) U-shaped ferrite core, (c) C-shaped ferrite core, and (d) E-shaped ferrite core of a secondary coil winding.

19. The transport system according to claim 12, wherein the at least one return conductor is retained with at least one of (a) force locking and (b) form-locking in a retaining profile.

20. The transport system according to claim 12, wherein provided parallel to a go conductor and the at least one return conductor is at least one of (a) a slotted coaxial conductor and (b) a leaky-wave conductor, along which an antenna of the carriage is movable for high-frequency data transfer upon movement of the carriage.

21. The transport system according to claim 12, wherein at least one of (a) a medium-frequency current and (b) a medium-frequency current with a frequency between 10 and 100 kHz is injectable into the primary conductor system.

22. The transport system according to claim 21, wherein a high-frequency alternating current with a minimum frequency of 150 kHz is superposed for data transfer.

23. A transport system comprising,
a rail system, rails of the rail system including a primary conductor system; and
carriages movably disposed on the rail system and including at least one secondary coil;
wherein the secondary coil is inductively coupled to the primary conductor system for contactless transfer of at least one of (a) electrical energy and (b) information,
wherein a cable-channel holder is clampable on a profile of the rail, a plurality of retaining profiles are attached to the cable-channel holder, the retaining profiles being adapted to accommodate one or more go conductors and one or more return conductors of the primary conductor system, the go conductors and return conductors being at least one of (a) joinable and (b) clippable onto the retaining profiles, using at least one of (a) form locking and (b) force locking,
wherein the rails are arranged as tubes, wheels of the carriages in contact with the tubes.

24. The transport system according to claim 23, wherein spacers are disposed along the rails and configured to the tubes in position relative to each other.

25. A transport system comprising,
a rail system, rails of the rail system including a primary conductor system; and
carriages movably disposed on the rail system and including at least one secondary coil;
wherein the secondary coil is inductively coupled to the primary conductor system for contactless transfer of at least one of (a) electrical energy and (b) information,
wherein a cable-channel holder is clampable on a profile of the rail, a plurality of retaining profiles are attached to the cable-channel holder, the retaining profiles being adapted to accommodate one or more go conductors and one or more return conductors of the primary conductor system, the go conductors and return conductors being at least one of (a) joinable and (b) clippable onto the retaining profiles, using at least one of (a) form locking and (b) force locking,
wherein provided parallel to a go conductor and the at least one return conductor is at least one of (a) a slotted coaxial conductor and (b) a leaky-wave conductor, along which an antenna of the carriage is movable for high-frequency data transfer upon movement of the carriage,
wherein the data transfer is implemented at least one of (a) redundantly and (b) via the inductive coupling of the primary conductor to a secondary winding and via coupling of the antenna to the primary conductor.

* * * * *